United States Patent
Nix et al.

(10) Patent No.: US 12,533,450 B2
(45) Date of Patent: Jan. 27, 2026

(54) DEVICE AND METHOD FOR DETERMINATION OF A CO2 PARTIAL PRESSURE VALUE ON A BLOOD SIDE OF AN OXYGENATOR

(71) Applicant: Abiomed Europe GmbH, Aachen (DE)

(72) Inventors: Christoph Nix, Aachen (DE); Verena Zscherlich, Aachen (DE)

(73) Assignee: Abiomed Europe GmbH, Aachen (DE)

( * ) Notice: Subject to any disclaimer, the term of this patent is extended or adjusted under 35 U.S.C. 154(b) by 601 days.

(21) Appl. No.: 17/913,502

(22) PCT Filed: Mar. 26, 2021

(86) PCT No.: PCT/EP2021/057962
§ 371 (c)(1),
(2) Date: Sep. 22, 2022

(87) PCT Pub. No.: WO2021/191429
PCT Pub. Date: Sep. 30, 2021

(65) Prior Publication Data
US 2023/0330311 A1 Oct. 19, 2023

(30) Foreign Application Priority Data

Mar. 27, 2020 (EP) .................................... 20166350

(51) Int. Cl.
*A61M 1/16* (2006.01)
*A61M 1/36* (2006.01)

(52) U.S. Cl.
CPC ........ *A61M 1/1698* (2013.01); *A61M 1/3609* (2014.02); *A61M 1/3666* (2013.01); *A61M 2230/202* (2013.01)

(58) Field of Classification Search
CPC .............. A61M 1/1698; A61M 1/3609; A61M 1/3666; A61M 2230/202; A61M 1/1601
See application file for complete search history.

(56) References Cited

U.S. PATENT DOCUMENTS

| 4,461,092 A | 7/1984 | Hore |
| 5,810,759 A | 9/1998 | Merz |
| (Continued) | | |

FOREIGN PATENT DOCUMENTS

| CN | 202051712 U | 11/2011 |
| CN | 106178159 A | 12/2016 |
| (Continued) | | |

OTHER PUBLICATIONS

Office Action from Taiwanese Application No. 110111078 dated Jan. 24, 2025 (9 pages).

(Continued)

*Primary Examiner* — Jessica Arble
(74) *Attorney, Agent, or Firm* — Botos Churchill IP Law LLP

(57) ABSTRACT

Device for determination of a CO2 partial pressure value on a blood side of an oxygenator having an oxygenator with a blood side, a gas side and a semipermeable membrane, wherein the membrane separates the blood side from the gas side, the gas side has an inlet and an outlet and, during operation of the oxygenator, a gas flow flows into the inlet to the outlet at a flow rate. The device also has a first sensor configured to measure CO2 partial pressure values of the gas side and a control unit configured to process the measured CO2 partial pressure values of the gas side and to determine a CO2 partial pressure value on the blood side based on the measured CO2 partial pressure values of the gas side. The control unit determines the CO2 partial pressure value on the blood side during operation of the oxygenator.

5 Claims, 4 Drawing Sheets

(56) References Cited

U.S. PATENT DOCUMENTS

| | | | |
|---|---|---|---|
| 2005/0056080 A1 | 3/2005 | Lucci et al. | |
| 2008/0097233 A1* | 4/2008 | Pedersen | A61B 5/14557 600/531 |
| 2011/0129389 A1* | 6/2011 | Brady | A61M 1/3666 422/48 |
| 2017/0361008 A1* | 12/2017 | Turner | A61M 1/3666 |
| 2018/0169320 A1* | 6/2018 | Gerder | A61M 1/1601 |
| 2021/0260266 A1* | 8/2021 | Conway | A61B 5/14542 |

FOREIGN PATENT DOCUMENTS

| | | |
|---|---|---|
| CN | 106377811 A | 2/2017 |
| CN | 206228666 U | 6/2017 |
| CN | 107405441 A | 11/2017 |
| GB | 2100859 A | 1/1983 |
| GB | 2533027 A | 6/2016 |
| JP | 2018139946 A | 9/2018 |
| JP | 2019527119 A | 9/2019 |
| WO | 9622730 A1 | 8/1996 |
| WO | 2012066280 A2 | 5/2012 |
| WO | 2018026671 A1 | 2/2018 |
| WO | 2019246320 A1 | 12/2019 |

OTHER PUBLICATIONS

Office Action issued in corresponding Japanese Patent Application No. 2022-558247, mailed on Dec. 17, 2024, 8 pages.

Office Action and Search Report issued in Chinese Patent Application No. 202180025133.2 dated Jun. 28, 2025 (14 pp.).

European Search Report for corresponding European Application No. 20166350.7 dated Sep. 29, 2020 (6 pages).

International Search Report and Written Opinion for corresponding International Application No. PCT/EP2021/057962 dated Jun. 25, 2021 (18 pages).

\* cited by examiner

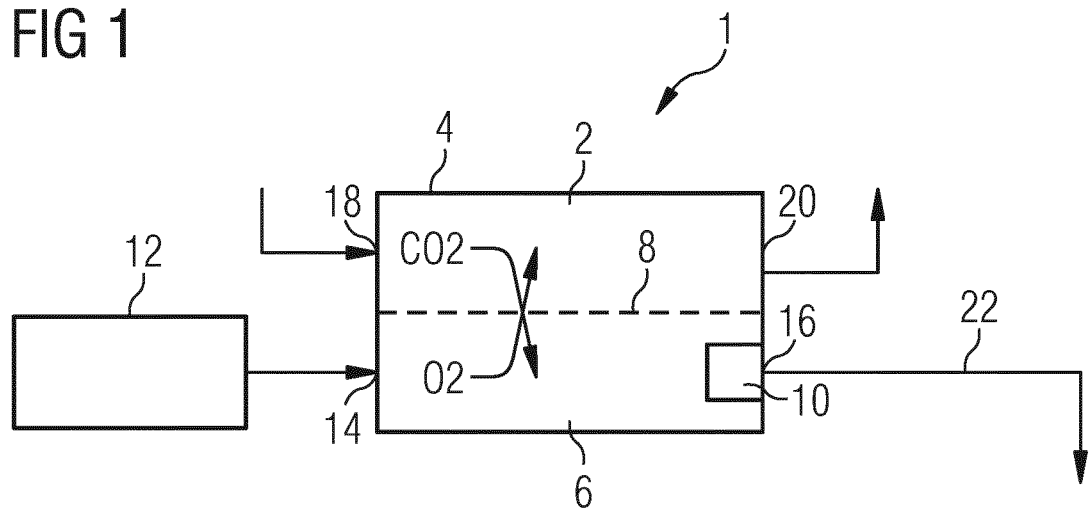
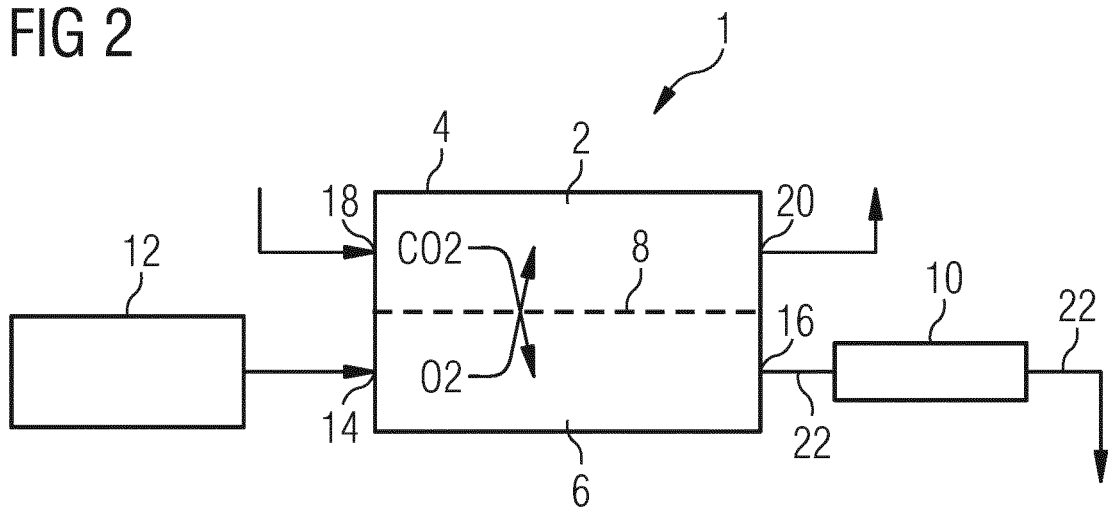

DEVICE AND METHOD FOR DETERMINATION OF A CO2 PARTIAL PRESSURE VALUE ON A BLOOD SIDE OF AN OXYGENATOR

CROSS REFERENCE TO RELATED APPLICATIONS

The present application is a national phase entry under 35 U.S.C. § 371 of International Application No. PCT/EP2021/057962 filed Mar. 26, 2021, published in English, which claims priority from European Patent Application No. 20166350.7 filed Mar. 27, 2020, all of which are incorporated herein by reference.

This present disclosure relates to a device and a method for determination of a CO2 partial pressure value on a blood side of an oxygenator, an extracorporeal membrane oxygenator system comprising said device, a cardiopulmonary bypass comprising said device and said method in an extracorporeal membrane oxygenator treatment or in a cardiopulmonary bypass comprising said method.

BACKGROUND

Oxygenators, in particular membrane oxygenators, are commonly known for use in cardiopulmonary bypass (CPB) systems or extracorporeal membrane oxygenation (ECMO) systems. While CPB is a rather short-term technique to take over the function of the heart and lungs during heart surgery, e.g. coronary bypass heart surgery, ECMO is a simplified version that can be used for longer-term treatments of a range of cardiac and pulmonary dysfunctions and for recovery. Both CPB and ECMO systems require an oxygenator to add oxygen (O2) to the patient's blood and to remove carbon dioxide (CO2) from the blood in order to mimic or assist the function of the patient's lungs, i.e. to allow the exchange of O2 and CO2 between the patient's blood and a gas phase inside the oxygenator to keep the levels of O2 and CO2 in the blood in a physiological range. In a membrane oxygenator, exchange of O2 and CO2 is accomplished via a semipermeable membrane which separates the blood side from the gas side inside the oxygenator, while enabling the diffusion of O2 and CO2 across/through the membrane. CO2 dissolved in the blood, in particular in the central arterial blood, plays a critical role in the regulation of a variety of physiological functions such as respiratory rates and reflex and maintenance of a normal pH in the blood of around 7.4. It is therefore essential to monitor and/or control the partial pressure of CO2 (pCO2) in the patient's (central arterial) blood during therapy.

When a CPB system is used during surgery, the oxygenator is placed near to the patient's heart and lungs. Therefore, the pCO2 on the blood side of the oxygenator at the outlet of the blood side of the oxygenator corresponds to the central arterial pCO2 of the patient. The pCO2 value on the blood side at the outlet of the blood side of the oxygenator can be estimated from a measurement of the pCO2 value on the gas side at the outlet of the gas side of the oxygenator, wherein the estimation is based on a characteristic map of the oxygenator type.

Several types of ECMO are known in the art. In the most common types of ECMO, blood is drained from a vein, then oxygenated in the extracorporeal membrane oxygenator and then returned to either an artery (veno-arterial ECMO) or to a vein (veno-venous ECMO) of the patient's body. Depending on the type of ECMO, the position of the vascular access or cannulation varies. In an ECMO which is not centrally cannulated, the central arterial pCO2 cannot be deduced from measurements on the gas side of the oxygenator. Therefore, during operation of such an ECMO system in the clinic, the arterial pCO2 is usually monitored by intermittent sampling of the patient's arterial blood and measuring the pCO2 in each sample.

A disadvantage of these methods is, however, that intermittent sampling is cumbersome and also causes a delay in the measurement result, while estimation of the pCO2 on the blood side at the outlet of the blood side of the oxygenator inevitably involves inaccuracies which can have a negative impact on the patient's health.

SUMMARY

It is therefore an object of the presently disclosed technology to overcome or at least mitigate the disadvantages of the prior art and in particular to provide a device and a method which allow a fast, easy and more reliable or accurate determination of the partial pressure of CO2 (pCO2) in the patient's blood.

The object is solved by a device according to the independent device claims and a method according to the independent method claims. Preferred embodiments of the device and the method are specified in the dependent claims.

According to the present disclosure, the patient's venous pCO2 as an indicator for the patient's overall condition can be monitored, in particular during an ECMO treatment, in addition to or instead of monitoring the central arterial pCO2 value. During operation of an oxygenator, the inlet of the blood side is in fluid connection with the patient's venous system and the outlet of the blood side is either in fluid connection with the patient's venous or arterial system, depending on the type of treatment system. While the outlet of the blood side of the oxygenator in a CPB is usually in fluid connection with the patient's arterial system, the outlet of the blood side in an ECMO can be connected to either the patient's venous or arterial system depending on the ECMO type (veno-venous or veno-arterial). In any case, the pCO2 value to be determined according to the presently disclosed technology is the pCO2 value of the patient's blood at the inlet of the blood side of the oxygenator. In all of the aforementioned cases, the pCO2 value at the inlet of the blood side is the patient's venous pCO2.

In an aspect of the presently disclosed technology, a device for determination of a CO2 partial pressure value (pCO2 value) of blood on a blood side of an oxygenator is provided, the device comprising: an oxygenator with a blood side, a gas side and a semipermeable membrane, wherein the membrane separates the blood side from the gas side, and the blood side and the gas side each has an inlet and an outlet, and, during operation of the oxygenator, a gas flows into the inlet of the gas side to the outlet of a gas side at a flow rate; a first sensor configured to measure pCO2 values in the gas of (or on) the gas side; a control unit configured to process the measured pCO2 values of the gas side and to determine a pCO2 value of blood on (or of) the blood side, in particular a pCO2 value of blood at the inlet of the blood side or at the outlet of the blood side, based on the measured pCO2 values of the gas side. In order to measure the pCO2 values of the gas side, the first sensor can either be provided directly at or inside the gas side of the oxygenator, i.e. at or upstream of the outlet of the gas side, or, at or inside a gas line connected to the gas side/the oxygenator, i.e. downstream of the outlet of the gas side. The control unit determines the pCO2 value of blood on the blood side during operation of the oxygenator, i.e. while the gas flows into the inlet of the gas side to the outlet of the gas side and blood flows into the inlet of the blood side to the outlet of the blood side, by calculating a change rate or change rate values of the pCO2 values measured in the gas of the gas side, and, when or after the calculated change rate values equal a predetermined change rate value or fall within a predetermined change rate value range at a predetermined (minimal) measuring distance, deducing the pCO2 value of blood on the blood side from the pCO2 values which are measured in the gas of the gas side when or after the calculated change rate values equal the predetermined change rate value or fall within the predetermined change rate value range at said predetermined (minimal) measuring distance.

By calculating the change rate or change rate values, it is possible to determine whether a diffusion equilibrium of CO2 between the gas side and the blood side has been reached, namely if the change rate or change rate values is/are (approximately) zero.

The predetermined change rate value may ideally be zero, however, due to measurement inaccuracies and/or measurement tolerances the predetermined change rate value may also be an infinitesimal value. It may further be beneficial to specify a predetermined change rate value range instead of a predetermined individual value, wherein the predetermined change rate range includes the tolerance values around the target value, e.g. zero, wherein the tolerance values depend on the particular measuring equipment.

When the equilibrium is reached, the measured pCO2 value in the gas of/on the gas side equals the pCO2 value of the blood on the blood side, at least at the measuring point, i.e. at the position of the first sensor. This means, the pCO2 value of the blood on the blood side can then be equated either to a specific single pCO2 value which is measured in the gas of/on the gas side when or after the calculated change rate equals the predetermined change rate value at said predetermined measuring distance, or to an average of all pCO2 values which are measured in the gas of the gas side when or after the calculated change rate equals the predetermined change rate value or falls within the predetermined change rate range at said predetermined measuring distance, or to an average of a plurality of specific pCO2 values which are measured in the gas of the gas side when or after the calculated change rate equals the predetermined change rate value or falls within the predetermined change rate range at said predetermined measuring distance, or any other combination of the above.

In this way, a convenient, accurate and fast determination of a pCO2 value of blood on the blood side of the oxygenator, in particular of the pCO2 value of blood at the inlet or at the outlet of the blood side of the oxygenator, can be achieved which can be used as an indicator value for the overall condition of the patient, which enables an improvement for the patient's treatment and health. Further, determination of the pCO2 value on the blood side during operation of the oxygenator means in particular that the determination can be made during therapy of a patient. Moreover, the above described device enables the determination of the pCO2 value on the blood side even in a case where the gas exchange characteristics of the oxygenator are not exactly known.

In a preferred embodiment, the change rate is a temporal change rate, i.e. a change rate over time, and the predetermined measuring distance is a predetermined period of time. This means the control unit can determine the pCO2 value on the blood side by calculating a change rate of the measured pCO2 values of the gas side over time, and, when or after the calculated change rate equals the predetermined change rate value for a predetermined (minimal) period of time, deducing the pCO2 value of blood on the blood side from the pCO2 values of the gas side which are measured during of after said period of time.

The predetermined period of time is a period of time after which it can be assumed that no further change in the measured pCO2 values of the gas side (beyond the measuring tolerance/the predetermined change rate value range) will occur. The predetermined period of time depends, inter alia, on flow velocities, the initial pCO2 value of the blood, sensor and membrane characteristics and is to be determined in advance for the device and the operating conditions. As a sensor for the pCO2 measurement in the gas, a nondispersive infrared sensor (NDIR sensor) can be used.

In another preferred embodiment, the device comprises a second sensor configured to measure CO2 partial pressure values of (or on) the gas side, wherein the change rate is a change rate over location, in particular over a distance in a flow direction of the gas, i.e. between the inlet of the gas side and the outlet of the gas side, and the predetermined measuring distance is a predetermined local measuring distance with the first sensor and the second sensor being positioned at the predetermined local measuring distance. This means the control unit can determine the pCO2 value on the blood side by calculating a change rate of the measured pCO2 values of the gas side over a local distance, and, when or after the calculated change rate equals the predetermined change rate value at a predetermined (minimal) local measuring distance, deducing the pCO2 value of blood on the blood side from the pCO2 values of the gas side which are measured when or after the calculated change rate equals the predetermined change rate value at a predetermined local measuring distance.

The predetermined local measuring distance is a local measuring distance at which it can be assumed that no further change in the measured pCO2 values of the gas side (beyond the measuring tolerance/the predetermined change rate value range) will occur, i.e. a sufficient local distance between the first sensor and the second sensor.

Said sufficient local distance depends, inter alia, on flow velocities, the initial pCO2 value of the blood, sensor and membrane characteristics and is to be determined in advance for the device and the operating conditions.

Preferably, the control unit is further configured to stop the gas flow into the inlet of the gas side, and the control unit stops the gas flow into the inlet of the gas side and preferably out of the outlet of the gas side, e.g. by at least one valve at or upstream of the inlet of the gas side and/or at or downstream of the outlet of the gas side, before deducing the CO2 partial pressure value on the blood side, in particular before or during calculating the change rate of the measured CO2 partial pressure values of the gas side over time. Preferably, the blood flow rate is maintained unchanged while the gas flow rate is stopped, and more preferably, the blood flow rate is maintained at the therapy flow rate.

When the flow of gas into the inlet of the gas side is stopped, CO2 diffusing from the blood side across/through the membrane into the gas side will accumulate in the gas side until a diffusion equilibrium is reached, i.e. until the pCO2 on the gas side is equal to the pCO2 value on the blood side. Since the blood on the blood side continues flowing through the blood side of the oxygenator while the gas is held on the gas side, the pCO2 value of the gas side equals the pCO2 value of the blood at the inlet of the blood side when the diffusion equilibrium is reached. In other words, the pCO2 value on/of the gas side at which the diffusion gradient of CO2 will become zero/infinitesimal over a certain period of time is the maximum pCO2 value of the blood on the blood side of the oxygenator, which is the pCO2 value of the (venous) blood at the inlet of the blood side. This means further that the CO2 diffusion equilibrium inside the oxygenator will be determined by the pCO2 value of the blood at the inlet of the blood side, since the pCO2 value at the inlet of the blood side is the maximum value inside the oxygenator, and therefore, the pCO2 value on the gas side will adjust to the pCO2 value of the blood at the inlet of the blood side over a certain period of time.

Further, while the flow of gas is stopped, the pCO2 values at the inlet of the gas side and the outlet of the gas side will adjust to the same value due to diffusion. This means, the pCO2 equilibrium value can be measured on the gas side at any point between the inlet of the gas side and the outlet of the gas side (and even at a point downstream of the outlet, if the flow of gas is stopped until this point), and a single sensor is enough to determine the pCO2 value on the blood side, when the gas is stopped until the pCO2 equilibrium is reached which is determined by calculation of the change rate of the pCO2 values measured on the gas side over time by the single sensor. After determination of the pCO2 value of the blood on the blood side, the control unit can increase the gas flow rate back to the normal (therapy) flow rate to proceed or continue the patient's therapy.

Further preferably, the control unit is configured to adapt the flow rate of the gas flow into the inlet of the gas side and the control unit gradually reduces the flow rate of the gas flow into the inlet of the gas side, i.e. continuously or at predetermined time intervals, until the calculated change rate over location equals the predetermined change rate value or falls within the predetermined change rate range at the predetermined local measuring distance. Preferably, the blood flow rate is maintained unchanged while the gas flow rate is reduced, and more preferably, the blood flow rate is maintained at the therapy flow rate. After determination of the pCO2 value of the blood on the blood side, the control unit can increase the gas flow rate back to the normal (therapy) flow rate to proceed or continue the patient's therapy.

When the gas flow through the gas side is reduced, in particular to a flow rate lower than the blood flow rate, the gas on the gas side will remain for a longer time inside the oxygenator than the blood on the blood side and CO2 diffusing from the blood side to the gas side will accumulate on the gas side either up to a pCO2 value (or a CO2 concentration) at which the diffusion gradient of CO2 between the blood side and the gas side is zero/infinitesimal, i.e. until the diffusion equilibrium of CO2 between the blood side and the gas side is reached, or up to a pCO2 value at which the diffusion gradient of CO2 is larger than zero/infinitesimal, i.e. the diffusion equilibrium of CO2 between the blood side and the gas side is not reached, which is the case when the gas is not held in the oxygenator long enough to reach the pCO2 equilibrium value, i.e. when the gas flow rate is too high and/or the membrane area/oxygenator length is too short. With the first sensor and the second sensor being fixedly positioned at the predetermined local measuring distance, the CO2 equilibrium will only be reached at a certain sufficiently low gas flow rate. Said sufficiently low gas flow rate is reached/found by the control unit gradually reducing the gas flow rate until the calculated change rate between the pCO2 value measured by the first sensor and the pCO2 value measured by the second sensor is zero/infinitesimal. In other words, compared to the above case in which the gas flow is stopped, i.e. the flow rate is reduced to zero, the waiting time until the calculated change rate becomes zero/infinitesimal is substituted by the gradual reduction of the gas flow rate until the change rate becomes zero/infinitesimal.

Further preferably, the control unit is configured to adapt the flow rate of the gas flow into the inlet and reduces the flow rate of the gas flow into the inlet to a predetermined reduced gas flow rate before deducing the CO2 partial pressure value on the blood side, in particular before or during calculating the change rate of the measured CO2 partial pressure values of the gas side, wherein, for calculating the change rate, the CO2 partial pressure values of the gas side are measured at a validated point or within a validated portion of the device, in particular of the gas side, for which validated point or validated portion it has been (previously) proven that the CO2 partial pressure of the gas side reaches a saturation value (at the maximum value inside the gas side, i.e. at the equilibrium value) at the predetermined reduced gas flow rate. In this embodiment, both the first sensor and the second sensor can be positioned within the validated portion in order to calculate a change rate over location. Alternatively, only one single sensor can provided within the validated portion in order to calculate a change rate over time.

As described above, the gas flow rate and the oxygenator length must be matched in order to reach the diffusion equilibrium of CO2 inside the gas side of the oxygenator, and the higher the gas flow rate is, the longer the oxygenator length must be. Prior to therapy, it is therefore experimentally tested what length of the oxygenator is sufficient in order to reach the CO2 diffusion equilibrium at the predetermined reduced flow rate. The portion downstream of the sufficient length is the validated portion and can be a portion of only the gas side (including the outlet of the gas side) or a portion comprising at least the outlet of the gas side (and preferably a part of the gas side upstream of the outlet) and a portion of the gas line downstream of the outlet.

In a preferred embodiment, the gas side of the oxygenator is formed by a plurality of hollow fibers through which the gas flows from the inlet to the outlet. The first sensor is connected to the gas side via only a part (or subset) of the hollow fibers, i.e. the sensor is not connected to all of the hollow fibers. In other words, the first sensor is connected to only a part of the gas side. The part of hollow fibers, to which the first sensor is connected, can be limited to a small amount of the plurality of fibers. Therein, the first sensor can be connected to the part of the hollow fibers at a downstream end of the part of the hollow fibers or downstream of the downstream end of the part of the hollow fibers. Thereby, the first sensor can measure CO2 partial pressure values of only the part of the hollow fibers, but not of all of the hollow fibers. Further, the control unit can process the measured CO2 partial pressure values of the part of the hollow fibers determine a CO2 partial pressure value on the blood side based on the measured CO2 partial pressure values of the part of the hollow fibers. The control unit can determine the CO2 partial pressure value on the blood side during operation of the oxygenator by calculating a change rate of the measured CO2 partial pressure values of the part of the hollow fibers, and, when or after the calculated change rate equals a predetermined change rate value or falls within a predetermined change rate range at a predetermined measuring distance, deduce the CO2 partial pressure value on the blood side from the CO2 partial pressure values of the part of the hollow fibers which are measured when or after the calculated change rate equals the predetermined change rate value or falls within the predetermined change rate range at the predetermined measuring distance.

A valve can be provided downstream of the first sensor, wherein the valve is configured to stop or reduce the gas flow through the part of the hollow fibers and the first sensor in a first state, and to release or increase the gas flow through the part of the hollow fibers and the first sensor in a second state.

When the change rate is a change rate over time and the predetermined measuring distance is a predetermined period of time, the control unit can be configured to stop the gas flow through the part of the hollow fibers by means of the valve. Therein, the control unit stops the gas flow through the part of the hollow fibers before deducing the CO2 partial pressure value on the blood side, in particular before or during calculating the change rate of the measured CO2 partial pressure values of the part of the hollow fibers.

Alternatively, when the change rate is a change rate over time and the predetermined measuring distance is a predetermined period of time, the control unit can be configured to reduce the flow rate of the gas flow through the part of the hollow fibers to a predetermined reduced gas flow rate by means of the valve before deducing the CO2 partial pressure value on the blood side, in particular before or during calculating the change rate of the measured CO2 partial pressure values of the part of the hollow fibers. Therein, for calculating the change rate, a position at which the CO2 partial pressure values of the part of the hollow fibers are measured is a validated position within the device, for which it has been proven that the CO2 partial pressure of the part of the hollow fibers reaches a saturation value at the predetermined reduced gas flow rate.

By the first sensor being connected to only a part of the fibers which constitute the gas side, it is possible to determine the CO2 partial pressure value on the blood side without altering or interrupting the gas flow on the entire gas side. This means that treatment of the patient can be maintained without interruption or substantial alteration, while the CO2 partial pressure value on the blood side is determined. Since the fibers of the gas side, to which the sensor is connected and through which the gas flow is stopped or reduced for measuring purposes, constitute only a small part of the gas side, the gas flow through the remaining major part of the gas side (i.e., all fibers of the plurality of fibers to which the sensor and the valve are not connected) is left undisturbed during the measurement of the CO2 partial pressure values and therapy of the patient is not impaired.

Preferably, in the case where the control unit gradually reduces the gas flow rate, the control unit is further configured to adapt the proportion of CO2 in (or of) the gas flow and the control unit increases the proportion of CO2 in (or of) the gas flow up to a predetermined increased proportion of CO2, in particular when or while the control unit reduces the flow rate. After determination of the pCO2 value of the blood on the blood side, the control unit can decrease the proportion of CO2 in the gas flow back to the normal (therapy) proportion of CO2 in the gas flow to proceed or continue the patient's therapy.

Further preferably, in the above described case in which either both sensors or a single sensor is/are provided within the validated portion, the control unit is configured to adapt the proportion of CO2 in (or of) the gas flow, wherein the control unit increases the proportion of CO2 in (or of) the gas flow up to a predetermined increased proportion of CO2 before deducing the CO2 partial pressure value on the blood side, in particular before, when or after the control unit reduces the flow rate to the predetermined reduced flow rate, and wherein for the validated point or validated portion it has been (previously) proven that the CO2 partial pressure of the gas side reaches the saturation value (at the maximum value inside the gas side, i.e. at the equilibrium value) at the predetermined reduced gas flow rate at the predetermined increased proportion of CO2. After determination of the pCO2 value of the blood on the blood side, the control unit can decrease the proportion of CO2 in the gas flow back to the normal (therapy) proportion of CO2 in the gas flow to proceed or continue the patient's therapy.

By increasing the proportion of CO2 in the gas flow, the difference between the pCO2 value of blood on the blood side at the inlet of the blood side, which is the maximum pCO2 value inside the oxygenator, and the pCO2 value of the gas on the gas side is reduced. In other words, the pCO2 gradient between the blood side and the gas side is reduced and therefore, the period of time/the reduction amount of the flow rate which is required to reach the diffusion equilibrium (approximately) is therefore reduced as well. Consequently, the pCO2 value of blood on the blood side at the inlet of the blood side can be determined faster.

The pCO2 value in the gas with the predetermined increased proportion of CO2 should be just below the patient's venous pCO2 value, which is ideally about 46 mm/Hg. Hence the pCO2 value of gas with the predetermined increased proportion of CO2 should be below 46 mm/Hg, preferably below 35 mm/Hg.

In another aspect of the presently disclosed technology, a device for determination of a CO2 partial pressure value on a blood side of an oxygenator is provided, the device comprising: an oxygenator with a blood side, a gas side and a semipermeable membrane, wherein the membrane separates the blood side from the gas side, the gas side has an inlet and an outlet and, during operation of the oxygenator, a gas flow flows into the inlet to the outlet at a flow rate; a first sensor configured to measure CO2 partial pressure values of (or on) the gas side; a control unit configured to control the flow rate of the gas flow into the inlet and to process the measured CO2 partial pressure values of the gas side and to determine a CO2 partial pressure value on (or of) the blood side based on the measured CO2 partial pressure values of the gas side, wherein the control unit determines the CO2 partial pressure value on the blood side during operation of the oxygenator by stopping the gas flow into the inlet (and preferably out of the outlet, e.g. by valves), measuring at least one CO2 partial pressure value of the gas side when a validated period of time after stopping the gas flow has lapsed, and deducing the CO2 partial pressure value on the blood side from the at least one CO2 partial pressure value of the gas side that is measured when the validated period of time has lapsed, for which validated period of time it has been (previously) proven that the CO2 partial pressure of the gas side reaches a saturation value (at the maximum value inside the gas side, i.e. at the equilibrium value).

Also in this way, a convenient, accurate and fast determination of a pCO2 value of blood on the blood side of the oxygenator, in particular of the pCO2 value of blood at the inlet or at the outlet of the blood side of the oxygenator, can be obtained which can be used as an indicator value for the overall condition of the patient, which enables an improvement for the patient's treatment and health.

In yet another aspect of the presently disclosed technology, a device for determination of a CO2 partial pressure value on a blood side of an oxygenator is provided, comprising: an oxygenator comprising a blood side, a gas side and a semipermeable membrane, wherein the membrane separates the blood side from the gas side, the gas side has an inlet and an outlet, a gas flow flows into the inlet to the outlet at a flow rate during operation of the oxygenator, and the gas side is formed by a plurality of hollow fibers through which the gas flows from the inlet to the outlet; a first sensor which is connected to a part of the plurality of hollow fibers of the gas side, preferably at a downstream end of the part of the hollow fibers or downstream of the downstream end of the part of the hollow fibers, wherein the first sensor is configured to measure CO2 partial pressure values of the part of the hollow fibers; a valve which is provided downstream of the first sensor, wherein the valve is configured to stop or reduce the gas flow through the part of the hollow fibers in a first state and to release or increase the gas flow through the part of the hollow fibers in a second state; a control unit which is configured to control the flow rate of the gas flow through the part of the hollow fibers by means of the valve and to process the measured CO2 partial pressure values of the part of the hollow fibers and to determine a CO2 partial pressure value on the blood side based on the measured CO2 partial pressure values of the part of the hollow fibers. Therein, the control unit determines the CO2 partial pressure value on the blood side during operation of the oxygenator by stopping the gas flow through the part of the hollow fibers by means of the valve, measuring at least one CO2 partial pressure value of the part of the hollow fibers when a validated period of time after stopping the gas flow has lapsed, and deducing the CO2 partial pressure value on the blood side from the at least one CO2 partial pressure value of the part of the hollow fibers which is measured when the validated period of time has lapsed, for which validated period of time it has been proven that the CO2 partial pressure of the part of the hollow fibers of the gas side reaches a saturation value.

Also in this way, a convenient, accurate and fast determination of a pCO2 value of blood on the blood side of the oxygenator can be obtained while leaving the treatment of the patient substantially undisturbed.

In yet another aspect of the presently disclosed technology, a device for determination of a CO2 partial pressure value on a blood side of an oxygenator is provided, the device comprising: an oxygenator with a blood side, a gas side and a semipermeable membrane, wherein the membrane separates the blood side from the gas side, the gas side has an inlet and an outlet and, during operation of the oxygenator, a gas flow flows into the inlet to the outlet at a flow rate; a first sensor configured to measure CO2 partial pressure values of (or on) the gas side; a control unit configured to control the flow rate of the gas flow into the inlet and to process the measured CO2 partial pressure values of the gas side and to determine a CO2 partial pressure value on the blood side based on (or of) the measured CO2 partial pressure values of the gas side, wherein the control unit determines the CO2 partial pressure value on the blood side during operation of the oxygenator by reducing the flow rate of the gas flow into the inlet of the gas side to a predetermined reduced gas flow rate, measuring at least one CO2 partial pressure value of the gas side when a validated period of time after reducing the flow rate to the predetermined reduced flow rate has lapsed and at a validated point or within a validated portion of the device, in particular of the gas side, and deducing the CO2 partial pressure value on the blood side from the at least one CO2 partial pressure value of the gas side that is measured at the validated point or within the validated portion when the validated period of time has lapsed, for which validated period of time and validated point or validated portion it has been (previously) proven that the CO2 partial pressure of the gas side reaches a saturation value (at the maximum value inside the gas side, i.e. at the equilibrium value).

In this way as well, a convenient, accurate and fast determination of a pCO2 value of blood on the blood side of the oxygenator, in particular of the pCO2 value of blood at the inlet or at the outlet of the blood side of the oxygenator, can be obtained which can be used as an indicator value for the overall condition of the patient, which enables an improvement for the patient's treatment and health.

In yet another aspect of the presently disclosed technology, a device for determination of a CO2 partial pressure value on a blood side of an oxygenator is provided, comprising: the oxygenator comprising a blood side, a gas side and a semipermeable membrane, wherein the membrane separates the blood side from the gas side, the gas side has an inlet and an outlet, a gas flow flows into the inlet to the outlet at a flow rate during operation of the oxygenator, and the gas side is formed by a plurality of hollow fibers through which the gas flows from the inlet to the outlet; a first sensor which is connected to a part of the plurality of hollow fibers of the gas side, preferably at a downstream end of the part of the hollow fibers or downstream of the downstream end of the part of hollow fibers, wherein the first sensor is configured to measure CO2 partial pressure values of the part of the hollow fibers of the gas side; a valve which is provided downstream of the first sensor, wherein the valve is configured to stop or reduce the gas flow through the part of the hollow fibers in a first state and to release or increase the gas flow through the part of the hollow fibers in a second state; a control unit which is configured to control the flow rate of the gas flow through the part of the hollow fibers by means of the valve, and to process the measured CO2 partial pressure values of the part of the hollow fibers and to determine a CO2 partial pressure value on the blood side based on the measured CO2 partial pressure values of the part of the hollow fibers. Therein, the control unit determines the CO2 partial pressure value on the blood side during operation of the oxygenator by reducing the flow rate of the gas flow through the part of the hollow fibers by means of the valve to a predetermined reduced gas flow rate, measuring at least one CO2 partial pressure value of the part of the hollow fibers when a validated period of time after reducing the flow rate to the predetermined reduced flow rate has lapsed and at a validated position, and deducing the CO2 partial pressure value on the blood side from the at least one CO2 partial pressure value of the part of the hollow fibers which is measured at the validated position when the validated period of time has lapsed, for which validated period of time and validated position it has been proven that the CO2 partial pressure of the hollow fibers of the gas side reaches a saturation value.

In this way as well, a convenient, accurate and fast determination of a pCO2 value of blood on the blood side of the oxygenator can be obtained while leaving the treatment of the patient substantially undisturbed.

In all the above described devices, the control unit can determine the CO2 partial pressure value on the blood side at predetermined time intervals and/or when a predetermined operating condition occurs, e.g. in the event of a medical abnormality or critical therapy values. In particular, when the calculated change rate and/or the measured pCO2 values of the gas side is/are constantly or intermittently monitored and the calculated change rate and/or the measured pCO2 values of the gas side fall(s) below or exceed(s) a predetermined limit value, the control unit determines the pCO2 value on the blood side.

Preferably, in all the above described devices, the first sensor is positioned inside the oxygenator at the outlet of the gas side or (immediately) downstream of the outlet. Positioning the first sensor, i.e. positioning the first measurement point, at the end of the oxygenator membrane (seen in the direction of flow) or downstream of the end of the oxygenator membrane ensures that the entire length of the oxygenator membrane is used for the diffusion equilibrium to be reached, which allows to keep oxygenator dimensions as small as possible.

Further preferably, in the cases where the change rate is to be measured over a local distance, at least one of the first sensor and the second sensor, preferably the first sensor and the second sensor, is/are positioned inside the oxygenator.

Optionally, a main gas line is provided downstream of the outlet of the gas side and a branch line branches off from the main line and one of the first sensor and the second sensor is positioned on or at the branch line. Having the sensor arranged on a branch line can solve or at least mitigate the problem of humidity during the pCO2 measurement.

Preferably, in the above-described devices comprising the sensor which is connected to only a part (or subset) of a plurality of hollow fibers constituting the gas side, the part of the hollow fibers of the gas side to which the first sensor is connected, is located, in a flow direction of the blood flow through the blood side, at the blood inlet. This allows the determination of the venous pCO2 value. Alternatively, the part of the hollow fibers of the gas side to which the first sensor is connected, can be located, in a flow direction of the blood flow through the blood side, at the blood outlet. This allows the determination of the arterial pCO2 value. It is also possible to provide the device with two or more sensors, each of which being connected to only a part (or subset) of the plurality of hollow fibers, at different positions in the direction of the blood flow through the blood side in order to determine two or more different pCO2 values on the blood side. For example, a first sensor is located at the blood inlet and a second sensor is located at the blood outlet so as to determine both the venous pCO2 value and the arterial pCO2 value.

In a further preferred embodiment, the above-described devices form part of an extracorporeal membrane oxygenation system (veno-venous or veno-arterial ECMO system). In another preferred embodiment, the above-described devices form part of a cardiopulmonary bypass system.

According to an aspect of the presently disclosed technology, a method for determining a pCO2 value (of blood) on a blood side of an oxygenator of a device is provided, the oxygenator comprising the blood side, a gas side and a semipermeable membrane which separates the blood side from the gas side, wherein the blood side and the gas side each has an inlet and an outlet and, during operation of the oxygenator, a gas flow flows into the inlet of the gas side to the outlet of the gas side at a flow rate, wherein the method comprises the steps:
  measuring pCO2 values in a gas of (or on) the gas side by means of a first sensor of the device;
  processing the measured pCO2 values of the gas side and determining a pCO2 value (of blood) on (or of) the blood side, in particular at the inlet of the blood side or at the outlet of the blood side, based on the pCO2 values measured in the gas of the gas side by means of a control unit of the device,
  wherein the control unit determines the pCO2 value (of blood) on the blood side during operation of the oxygenator by the further steps of
  calculating a change rate or change rate values of the pCO2 values measured in the gas of the gas side, and, when or after the change rate or change rate values equal a predetermined change rate value or fall within a predetermined change rate value range at a predetermined measuring distance, deducing the pCO2 value (of blood) on the blood side from the pCO2 values which are measured in the gas of the gas side when or after the calculated change rate or calculated change rate values equal the predetermined change rate value or fall within the predetermined change rate value range at the predetermined measuring distance.

Preferably, the change rate is a change rate over time and the predetermined measuring distance is a predetermined period of time.

Preferably, the change rate is a change rate over location and the predetermined measuring distance is a predetermined local measuring distance, wherein the CO2 partial pressure values of the gas side are measured at the predetermined local measuring distance by means of the first sensor and a second sensor of the device, said second sensor being positioned at the predetermined local measuring distance from the first sensor.

Preferably, the control unit determines the CO2 partial pressure value on the blood side by the further step of stopping the gas flow into the inlet of the gas side before deducing the CO2 partial pressure value on the blood side, in particular before or during calculating the change rate of the measured CO2 partial pressure values of the gas side.

Preferably, the control unit determines the CO2 partial pressure value on the blood side by the further step of gradually reducing the flow rate of the gas flow into the inlet of the gas side until the change rate over location equals the predetermined change rate value or falls within a predetermined change rate range at the predetermined local measuring distance.

Preferably, the control unit determines the CO2 partial pressure value on the blood side by the further step of reducing the gas flow into the inlet of the gas side to a predetermined reduced gas flow rate before deducing the CO2 partial pressure value on the blood side, in particular before or during calculating the change rate of the measured CO2 partial pressure values of the gas side, wherein, for calculating the change rate, the CO2 partial pressure values of the gas side are measured at a validated point or within a validated portion of the device, in particular of the gas side, for which validated point or validated portion it has been proven that the CO2 partial pressure reaches a saturation value at the predetermined flow rate.

In a preferred embodiment, the gas side is formed by a plurality of hollow fibers through which the gas flows from the inlet to the outlet, and the first sensor is connected to the gas side via only a part of the hollow fibers of the gas side, preferably at a downstream end of the part of the hollow fibers or downstream of the downstream end of the hollow fibers. Further, in the step of measuring CO2 partial pressure values by means of the first sensor, the CO2 partial pressure values of the part of the hollow fibers are measured, in the step of processing the measured CO2 partial pressure values and determining a CO2 partial pressure value on the blood side based on the measured CO2 partial pressure values, the measured CO2 partial pressure values of the part of the hollow fibers of the gas side are processed and the CO2 partial pressure value on the blood side is determined based on the measured CO2 partial pressure values of the part of the hollow fibers. Further, in the step of calculating a change rate of the measured CO2 partial pressure values of the gas side, a change rate of the measured CO2 partial pressure values of the part of the hollow fibers of the gas side is calculated, and in the step of deducing the CO2 partial pressure value on the blood side from the measured CO2 partial pressure values, the CO2 partial pressure value on the blood side is deduced from the CO2 partial pressure values of the part of the hollow fibers which are measured when or after the calculated change rate equals the predetermined change rate value or falls within the predetermined change rate range at the predetermined measuring distance.

A valve can be provided downstream of the first sensor, wherein the valve is configured to stop or reduce the gas flow through the part of the hollow fibers of the gas side in a first state and to release or increase the gas flow through the part of the hollow fibers in a second state.

When the change rate is a change rate over time and the predetermined measuring distance is a predetermined period of time, the control unit can determine the CO2 partial pressure value on the blood side by the further step of stopping the gas flow through the part of the hollow fibers of the gas side by means of the valve before deducing the CO2 partial pressure value on the blood side, in particular before or during calculating the change rate of the measured CO2 partial pressure values of the part of the hollow fibers.

Alternatively, when the change rate is a change rate over time and the predetermined measuring distance is a predetermined period of time, the control unit can determine the CO2 partial pressure value on the blood side by the further step of reducing the gas flow through the part of the hollow fibers to a predetermined reduced gas flow rate by means of the valve before deducing the CO2 partial pressure value on the blood side, in particular before or during calculating the change rate of the measured CO2 partial pressure values of the part of the hollow fibers, wherein, for calculating the change rate, the CO2 partial pressure values of the part of the hollow fibers of the gas side are measured at a validated position within the device for which it has been proven that the CO2 partial pressure of the part of the hollow fibers reaches a saturation value at the predetermined reduced gas flow rate.

Further preferably, in the case where the control unit changes the gas flow rate before deducing the CO2 partial pressure value on the blood side, i.e. stops the gas flow into the inlet of the gas side or reduces the flow rate of the gas flow into the inlet of the gas side (gradually or to a predetermined gas flow rate), the (current) pCO2 value in the gas of (or on) the gas side is measured (directly/immediately) before the control unit changes the gas flow rate.

Preferably, the control unit determines the CO2 partial pressure value on the blood side by the further step of increasing the proportion of CO2 in the gas flow up to a predetermined proportion of CO2, in particular before stopping the gas flow or before, when or while reducing the flow rate.

Preferably, the control unit determines the CO2 partial pressure value on the blood side by the further step of increasing the proportion of CO2 in the gas flow up to a predetermined increased proportion of CO2 before deducing the CO2 partial pressure value on the blood side, in particular before, when or after reducing the flow rate to the predetermined reduced flow rate, wherein for the validated point or validated portion it has been proven that the CO2 partial pressure reaches the saturation value at the predetermined flow rate at the predetermined increased proportion of CO2.

In another aspect of the presently disclosed technology, a method for determining a CO2 partial pressure value on a blood side of an oxygenator of a device is provided, the oxygenator comprising the blood side, a gas side and a semipermeable membrane which separates the blood side from the gas side, wherein the gas side has an inlet and an outlet and, during operation of the oxygenator, a gas flow flows into the inlet to the outlet at a flow rate, the method comprising the steps: measuring at least one CO2 partial pressure value of (or on) the gas side by means of a first sensor of the device; processing the at least one measured CO2 partial pressure value of the gas side and determining a CO2 partial pressure value on (or of) the blood side based on the at least one measured CO2 partial pressure values of the gas side by means of a control unit of the device; controlling the flow rate of the gas flow into the inlet of the gas side by means of the control unit, wherein the control unit determines the CO2 partial pressure value on the blood side during operation of the oxygenator by the further steps of stopping the gas flow into the inlet of the gas side (and preferably out of the outlet of the gas side, e.g. by valves), measuring the at least one CO2 partial pressure value of the gas side when a validated period of time after stopping the gas flow has lapsed, and deducing the CO2 partial pressure value on the blood side from the at least one CO2 partial pressure value of the gas side that is measured when the validated period of time has lapsed, for which validated period of time it has been (previously) proven that the CO2 partial pressure of the gas side reaches a saturation value (at the maximum value inside the gas side, i.e. at the equilibrium value).

In yet another aspect of the presently disclosed technology, a method for determining a CO2 partial pressure value on a blood side of an oxygenator of a device is provided, the device comprising: the oxygenator comprising the blood side, a gas side and a semipermeable membrane which separates the blood side from the gas side, wherein the gas side has an inlet and an outlet, a gas flow flows into the inlet to the outlet at a flow rate during operation of the oxygenator, and the gas side is formed by a plurality of hollow fibers through which the gas flows from the inlet to the outlet; a first sensor which is connected to only a part of the plurality of hollow fibers of the gas side, preferably at a downstream end of the part of the hollow fibers or downstream of the downstream end of the hollow fibers, the first sensor being configured to measure CO2 partial pressure values of the part of the hollow fibers of the gas side; and a valve which is provided downstream of the first sensor, the valve being configured to stop or reduce the gas flow through the part of the hollow fibers in a first state and to release or increase the gas flow through the part of the hollow fibers in a second state, wherein the method comprises the steps: controlling the flow rate of the gas flow through the part of the hollow fibers by means of a control unit of the device; measuring at least one CO2 partial pressure value of the part of the hollow fibers of the gas side by means of the first sensor; processing the at least one measured CO2 partial pressure value of the part of the hollow fibers and determining a CO2 partial pressure value on the blood side based on the at least one measured CO2 partial pressure value of the part of the hollow fibers of the gas side by means of the control unit, wherein the control unit determines the CO2 partial pressure value on the blood side during operation of the oxygenator by the further steps of: stopping the gas flow through the part of the hollow fibers by means of the valve, measuring the at least one CO2 partial pressure value of the part of the hollow fibers when a validated period of time after stopping the gas flow has lapsed, and deducing the CO2 partial pressure value on the blood side from the at least one CO2 partial pressure value of the part of the hollow fibers which is measured when the validated period of time has lapsed, for which validated period of time it has been proven that the CO2 partial pressure of the part of the hollow fibers of the gas side reaches a saturation value.

In yet another aspect of the presently disclosed technology, a method for determining a CO2 partial pressure value on a blood side of an oxygenator of a device is provided, the oxygenator comprising the blood side, a gas side and a semipermeable membrane which separates the blood side from the gas side, wherein the gas side has an inlet and an outlet and, during operation of the oxygenator, a gas flow flows into the inlet of the gas side to the outlet of the gas side at a flow rate, the method comprising the steps: measuring at least one CO2 partial pressure value of (or on) the gas side by means of a first sensor of the device; processing the at least one measured CO2 partial pressure value of the gas side and determining a CO2 partial pressure value on (or of) the blood side based on the at least one measured CO2 partial pressure values of the gas side by means of a control unit of the device, controlling the flow rate of the gas flow into the inlet of the gas side by means of the control unit, wherein the control unit determines the CO2 partial pressure value on the blood side during operation of the oxygenator by the further steps of reducing the flow rate of the gas flow into the inlet of the gas side to a predetermined reduced gas flow rate, measuring the at least one CO2 partial pressure value of the gas side when a validated period of time after reducing the flow rate to the predetermined reduced flow rate has lapsed and at a validated point or within a validated portion of the device, in particular of the gas side, and deducing the CO2 partial pressure value on the blood side from the at least one CO2 partial pressure value of the gas side that is measured at the validated point or within the validated portion when the validated period of time has lapsed, for which validated period of time and validated point or validated portion it has been (previously) proven that the CO2 partial pressure of the gas side reaches a saturation value (at the maximum value inside the gas side, i.e. at the equilibrium value).

In yet another aspect of the presently disclosed technology, a method for determining a CO2 partial pressure value on a blood side of an oxygenator of a device is provided, the device comprising: the oxygenator comprising the blood side, a gas side and a semipermeable membrane which separates the blood side from the gas side, wherein the gas side has an inlet and an outlet, a gas flow flows into the inlet to the outlet at a flow rate during operation of the oxygenator, and the gas side is formed by a plurality of hollow fibers through which the gas flows from the inlet to the outlet; a first sensor which is connected to only a part of the plurality of hollow fibers of the gas side, preferably at a downstream end of the part of the hollow fibers or downstream of the downstream end of the part of the hollow fibers, the first sensor being configured to measure CO2 partial pressure values of the part of the plurality of hollow fibers of the gas side; and a valve which is provided downstream of the first sensor, wherein the valve is configured to stop or reduce the gas flow through the part of the hollow fibers in a first state and to release or increase the gas flow through the part of the plurality of hollow fibers in a second state, wherein the method comprises the steps: controlling the flow rate of the gas flow through the part of the hollow fibers by means of a control unit of the device; measuring at least one CO2 partial pressure value of the part of the hollow fibers by means of the first sensor; processing the at least one measured CO2 partial pressure value of the part of the hollow fibers and determining a CO2 partial pressure value on the blood side based on the at least one measured CO2 partial pressure value of the part of the hollow fibers by means of the control unit, wherein the control unit determines the CO2 partial pressure value on the blood side during operation of the oxygenator by the further steps of: reducing the flow rate of the gas flow through the part of the hollow fibers to a predetermined reduced gas flow rate, measuring the at least one CO2 partial pressure value of the part of the hollow fibers when a validated period of time after reducing the flow rate to the predetermined reduced flow rate has lapsed and at a validated position within the device, and deducing the CO2 partial pressure value on the blood side from the at least one CO2 partial pressure value of the part of the hollow fibers which is measured at the validated position when the validated period of time has lapsed, for which validated period of time and validated position it has been proven that the CO2 partial pressure of the part of the hollow fibers of the gas side reaches a saturation value.

Preferably, in all the above aspects, the control unit determines the CO2 partial pressure value on the blood side at predetermined time intervals and/or when a predetermined operating condition occurs.

In a preferred embodiment of the method, the first sensor is positioned inside the oxygenator at the outlet of the gas side or downstream of the outlet.

In a further preferred embodiment of the method, a main gas line is provided downstream of the outlet of the gas side and a branch line branches off from the main line and the first sensor is positioned on/at the branch line.

Preferably, in the above-described methods in which the sensor is connected to only a part of a plurality of hollow fibers constituting the gas side, the part of the hollow fibers of the gas side to which the first sensor is connected, is located, in a flow direction of the blood flow through the blood side, at the blood inlet. Alternatively, the part of the hollow fibers of the gas side to which the first sensor is connected, can be located, in a flow direction of the blood flow through the blood side, at the blood outlet.

It is also possible to provide two or more sensors, each of which being connected to only a part of the plurality of hollow fibers, at different positions in the direction of the blood flow through the blood side. For example, a first sensor is located at the blood inlet and a second sensor is located at the blood outlet.

The above-described method can be carried out in an extracorporeal membrane oxygenation treatment, preferably a veno-venous extracorporeal membrane oxygenation treatment or a veno-arterial extracorporeal membrane oxygenation treatment. Further, the above-described method can be carried out in a cardiopulmonary bypass treatment.

The above-described devices are configured to carry out the above-described methods and the above-described methods are designed to be carried out by the above-described devices. Advantages and variants of the above-described devices apply to the above-described methods accordingly.

BRIEF DESCRIPTION OF THE DRAWINGS

The foregoing summary, as well as the following detailed description of preferred embodiments, will be better understood when read in conjunction with the appended drawings. For the purpose of illustrating the present disclosure, reference is made to the drawings. The scope of the disclosure is not limited, however, to the specific embodiments disclosed in the drawings. In the drawings:

FIG. 1 shows a schematic view of a device for determination of a pCO2 value on a blood side of an oxygenator according to a first embodiment of the presently disclosed technology;

FIG. 2 shows a schematic view of a device for determination of a pCO2 value on a blood side of an oxygenator according to a second embodiment of the presently disclosed technology;

DETAILED DESCRIPTION

Figure 3:
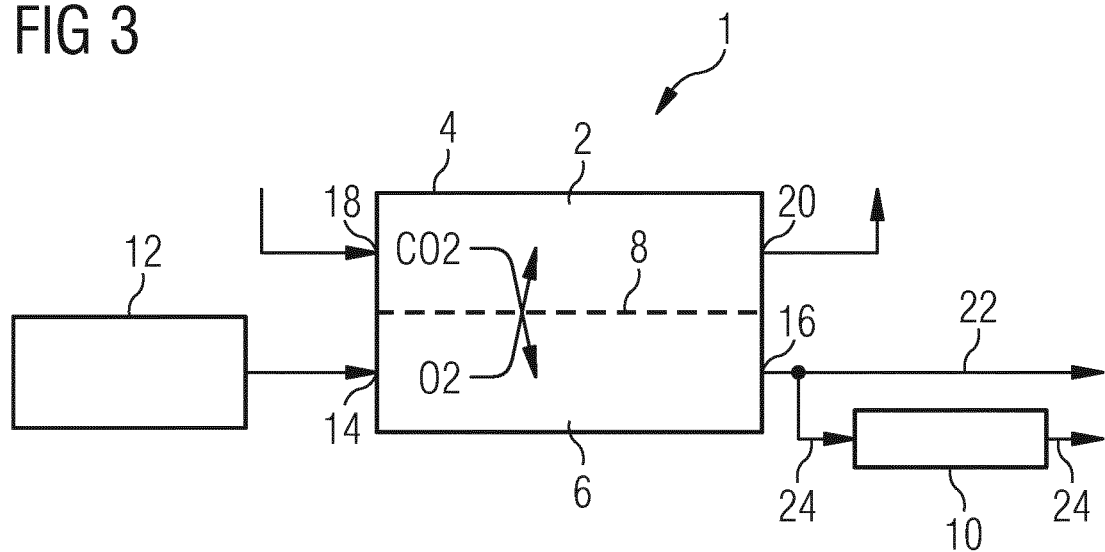
FIG. 3 shows a schematic view of a device for determination of a pCO2 value on a blood side of an oxygenator according to a third embodiment of the presently disclosed technology.

FIG. 1 shows a schematic view of a device 1 for determination of a pCO2 value of blood on a blood side 2 of an oxygenator 4 according to a first embodiment of the presently disclosed technology. The device 1 comprises an oxygenator 4 with a blood side 2, a gas side 6 and a semipermeable membrane 8 which separates the blood side 2 from the gas side 6. The device 1 further comprises a sensor 10 configured for measuring a pCO2 value of gas on the gas side 6 and a control unit 12 configured for, inter alia, controlling a gas flow rate of gas from a source (not shown), e.g. the medical gas outlet in the hospital, into the gas side 6 of the oxygenator 4, a proportion of CO2 in the gas flow, e.g. by controlling a valve unit (not shown) upstream of the oxygenator 4, and for receiving and processing the pCO2 values measured by the sensor 10. The gas side 6 of the oxygenator 4 has an inlet 14 and an outlet 16, and the blood side 2 has an inlet 18 and an outlet 20. A main line 22 for conducting gas is connected to oxygenator 4 downstream of the outlet 16 of the gas side 6.

The oxygenator 4 of the embodiment described above is operated in a cocurrent mode, i.e. gas flowing into the inlet 14 of the gas side 6 and blood flowing into the inlet 18 of the blood side 2 are flowing in the same direction along the membrane 8 to their respective outlets 16, 20. However, there can be other types of oxygenators with a different mode of operation that can be used according to the presently disclosed technology. In any case, during operation of the oxygenator 4, CO2 contained/solved in the blood which flows into and through the blood side 2 is to be extracted from the blood by diffusion across/through the membrane 8 and into the gas which flows into and through the gas side 6. To enable the diffusion of CO2 from the blood side to the gas side, a CO2 diffusion gradient is required which means that the CO2 concentration or the CO2 partial pressure (pCO2) in the gas needs to be lower than in the blood. At the same time, O2 contained in the gas flowing into and through the gas side 6 is supposed to diffuse across the membrane 8 and into the blood flowing into and through the blood side 2, which requires an O2 diffusion gradient, i.e. the O2 concentration or the O2 partial pressure (pO2) in the gas needs to be higher than in the blood. This way, an exchange of O2 and CO2 between the gas side and the blood side is induced.

During operation of the device 1, the inlet 18 of the blood side 2 is connected to the patient's venous system. This means, since the oxygenator 4 is supposed to take over the function of the patient's lungs, blood flowing into the blood side 2 at the inlet 18 of the blood side 2 has the highest concentration of CO2 or the highest pCO2 in the patient's blood circulation and the lowest concentration of O2 or the lowest pO2 in the patient's blood circulation, while blood flowing out of the blood side 2 at the outlet 20 of the blood side 2 has the lowest concentration of CO2 or the lowest pCO2 in the patient's blood circulation and the highest concentration of O2 or the highest pO2 in the patient's blood circulation. The outlet 20 of the blood side 2 can be connected to the patient's venous or arterial system, depending on the type of treatment.

To determine the patient's CO2 overall condition, according to the presently disclosed technology, the pCO2 value of the venous blood at the inlet 18 of the blood side 2 can be used as an indicator. To determine said pCO2 value at the inlet 18 of the blood side 2, the gas flow is significantly reduced to a predetermined reduced gas flow rate or completely stopped, i.e. reduced to zero. At the same time, the blood flow through the blood side 2 is maintained, e.g. at the normal therapy flow rate. The CO2 dissolved in the blood, which proceeds flowing through the blood side 2, now diffuses across the membrane 8 into the gas, which is held on the gas side 6 (for a longer time compared to normal therapy flow rate), and accumulates in the gas until the CO2 diffusion gradient becomes zero (or infinitesimal). In the case where the gas flow into the inlet 16 of the gas side 6 is completely stopped (e.g. by valves at or upstream of the inlet 14 and/or at or downstream of the outlet 16), after a certain time, the CO2 diffusion gradient becomes zero in the entire gas side 6, i.e. over the entire length of the oxygenator 4 or, in other words, over the entire longitudinal section between the inlet 14 of the gas side 6 and the outlet 16 of the gas side, due to diffusion inside the gas side 6. In the case where the gas flow into the inlet 16 of the gas side 6 is reduced to the predetermined reduced gas flow rate, after a certain time, the CO2 diffusion gradient becomes zero only over a certain longitudinal section between the inlet 14 of the gas side 6 and the outlet 16 of the gas side depending on the particular reduced gas flow rate. The section over which the diffusion gradient will become reliably zero after a certain time at the predetermined reduced gas flow rate, is the validated portion of the gas side. This means that, prior to therapy, it has been experimentally proven for said section at said reduced flow rate that the diffusion gradient would become zero after a certain time. The validated portion can extend beyond the outlet 16 of the gas side 6 into the connected main line 22, since the pCO2 value downstream of the outlet 16 is constant and has the same value as at the outlet 16 of the gas side 6, while the outlet 16 itself must be within the validated portion to ensure sufficient length of the oxygenator to reach the CO2 diffusion equilibrium inside the oxygenator 4.

Therefore, in order to determine or to measure that the pCO2 equilibrium on the gas side is reached, in the case where the gas flow into the inlet 14 is stopped, the sensor 10 can be positioned at the inlet 14, at the outlet 16 or anywhere between the inlet 14 and the outlet 16, and in the case where the gas flow is reduced to the predetermined gas flow rate, the sensor 10 can be positioned within the validated portion of the gas side. Then, after the gas flow has been stopped or reduced by the control unit 12, the pCO2 value on/of the gas side 6 is measured by the sensor 10 and the control unit 12 receives and processes the pCO2 values measured by the sensor 10 and deduces the pCO2 value on the inlet 18 of the blood side 2 from the pCO2 values measured by the sensor 12 on the gas side 6 by calculating a change rate of the pCO2 values measured by the sensor 10 over time in order to determine if the diffusion equilibrium of CO2 across/through the membrane 8 has been reached. The equilibrium is reached when the change rate is (approximately) zero or infinitesimal (and does not change for a predetermined period of time after which it can be assumed that no further change in the change rate occurs), this means the pCO2 value measured on the gas side 6 when or after the equilibrium is reached corresponds to the pCO2 value of blood at the inlet 18 of the blood side 2 and, the other way round, the pCO2 value of blood at the inlet 18 of the blood side 2, i.e. of the patient's venous blood, is identical to the pCO2 value measured by the sensor 10 of/on the gas side 6.

After the equilibrium is reached and after the pCO2 value at the inlet 18 of the blood side 2 is determined, the flow rate of gas into the inlet 14 of the gas side 6 can be increased to the normal therapy gas flow rate in order to continue or proceed with the normal oxygenation treatment. The above described determination of the pCO2 value at the inlet 18 of the blood side 2 can be repeated as often as necessary during the patient's treatment, e.g. at regular intervals, for close monitoring of the patient's condition.

To accelerate the CO2 diffusion equilibrium, the control unit 12 can increase the proportion of CO2 in the gas flowing into the inlet 14 of the gas side 6 up to a predetermined increased proportion of CO2 before or during the calculation of the change rate of the pCO2 values measured on the gas side 6 is or at least before deducing the pCO2 value on the blood side 2 is started.

In a preferred embodiment, the proportion of CO2 in the gas flow is increased before the gas flow rate is reduced or stopped. In particular, after the proportion of CO2 in the gas flow has been increased, the gas flow is only reduced or stopped after a specific period of time, which is the time it takes for the gas to flow from the inlet 14 to the outlet 16.

In the first embodiment of the device 1 as shown in FIG. 1, the sensor 10 is provided inside the oxygenator 4 on the gas side 6 directly at the outlet 16.

A second embodiment of the device 1 according to the presently disclosed technology is shown in FIG. 2. The embodiment shown in FIG. 2 corresponds to the above-described embodiment shown in FIG. 1 with the difference that the sensor 10 is not provided inside the oxygenator 4, but downstream of the outlet 16 of the gas side 6 in or at the main line 22, which facilitates the construction and the maintenance of the device 1. In the case where the gas flow into the inlet 14 of the gas side 6 is stopped and valves are used, the valve downstream of the outlet 16 is positioned downstream of the sensor 10.

A third embodiment of the device 1 according to the presently disclosed technology is shown in FIG. 3. The embodiment shown in FIG. 3 corresponds to the above-described embodiment shown in FIG. 2 with the difference that the sensor 10 is not provided in or on the main line 22, but in or on a branch line 24 that branches off from the main line 22, which can facilitate the measurement of pCO2 at high humidity levels. In the case where the gas flow into the inlet 14 of the gas side 6 is stopped and valves are used, two valves are positioned downstream of the outlet 16, one being at or downstream of the branch point at the main line 22 and one being downstream of the sensor 10 at the branch line 24.

Figure 4:
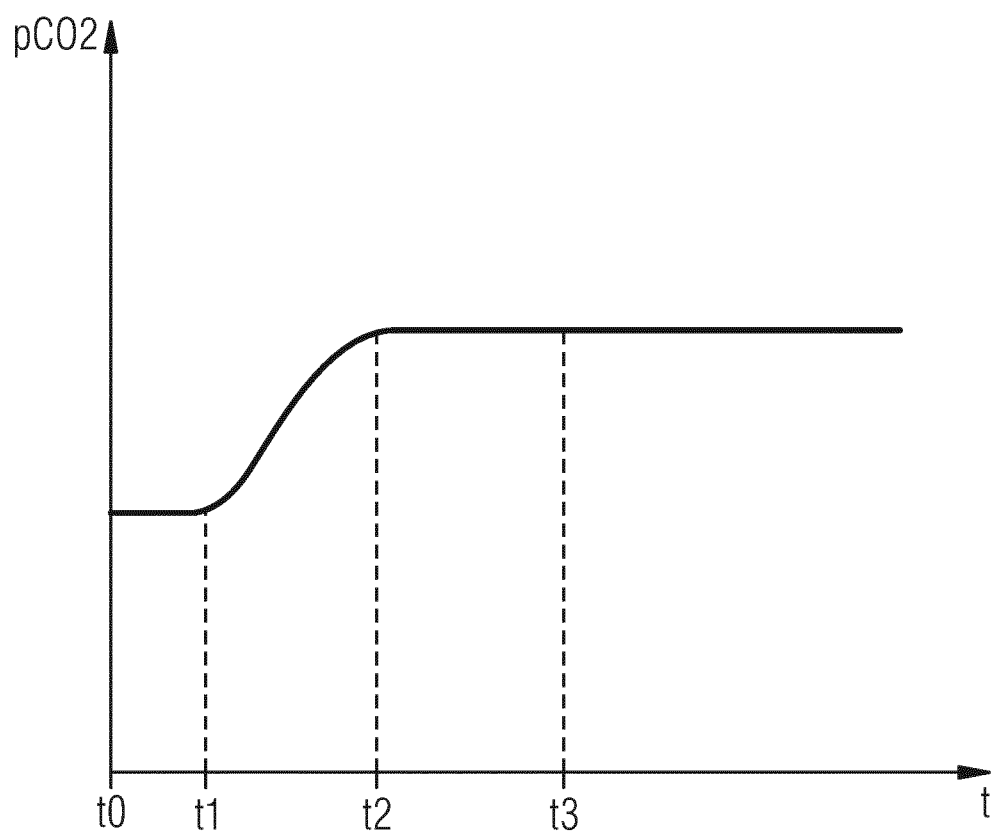
FIG. 4 shows a diagram schematically illustrating the pCO2 value at a measuring point on the gas side over time.

FIG. 4 shows a diagram that schematically illustrates the pCO2 value measured by the sensor 10 over time t, after the gas flow rate is reduced to a predetermined reduced gas flow rate or completely stopped, wherein in the case where the gas flow is reduced, the sensor 10 is positioned within the validated portion of the device 1. The gas flow rate is reduced or stopped at time t0. Until time t1, the measured pCO2 value remains constant. (In the case where the gas flow is stopped, the time interval between t0 and t1 can be approximately zero, depending on the position of the sensor 10 and the diffusion rate inside the gas side 6.) At time t1, the pCO2 value rises up to a maximum that is reached at time t2. After time t2, the measured pCO2 value remains (approximately) constant, which is why at time t3 the measured pCO2 value is the same as the pCO2 value measured at time t2, i.e. the calculated pCO2 change rate value between time t2 and time t3 is zero/infinitesimal. The constant pCO2 value measured at and after time t2 is the pCO2 equilibrium value on the gas side which corresponds to the pCO2 value at the inlet 18 of the blood side 2, i.e. the pCO2 value of the patient's venous blood.

It is noted that the measurement curve shown in FIG. 4 is of a purely schematic nature and the slopes and the linear sections between the times t0 and t3 can vary depending on the type of oxygenator, and/or the flow rates of both blood and gas.

Depending on the oxygenator type, in particular the membrane type, and the flow rates of blood and gas through the oxygenator 4, time t2, i.e. the CO2 diffusion equilibrium, is reached in a shorter or longer period of time. Similar to the validated portion of the device 1, a validated period of time after the gas flow is stopped or reduced can be determined by experiment prior to therapy use of the oxygenator, wherein the validated period of time is the period of time that is proven sufficient to reach the pCO2 equilibrium on the gas side 6. If the gas flow is stopped and the validated period of time after the gas flow has been stopped has lapsed, a single measurement of the pCO2 value of the gas side is sufficient for the determination of the pCO2 value on the blood side 2, since it has been proven that after the validated period of time the pCO2 equilibrium is reached and therefore, a change rate does not have to be calculated. If the gas flow is reduced to the predetermined reduced gas flow rate, the validated period of time is to be determined for the validated portion.

Figure 5:
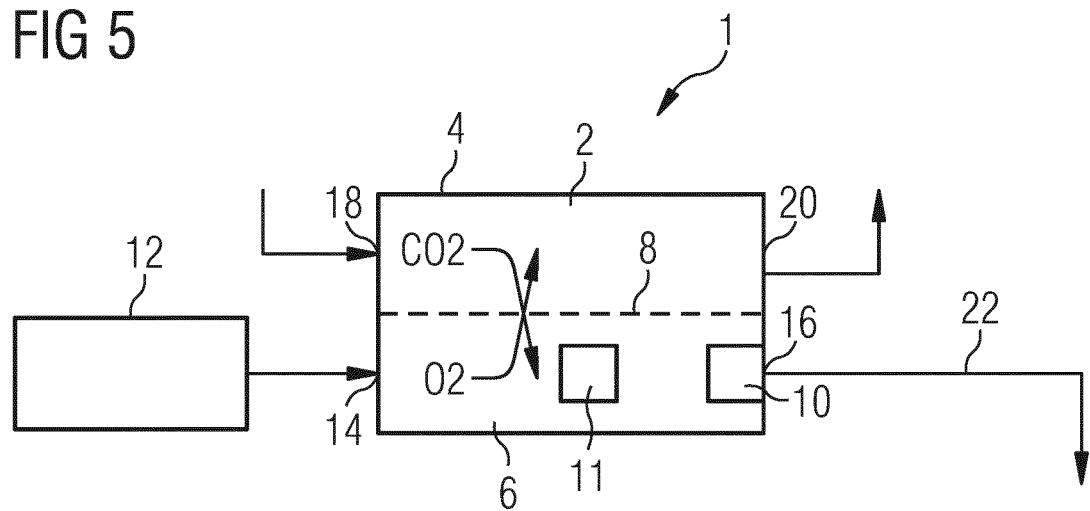
FIG. 5 shows shows a schematic view of a device for determination of a pCO2 value on a blood side of an oxygenator according to a fourth embodiment of the presently disclosed technology.

A fourth embodiment of the device 1 according to the presently disclosed technology is shown in FIG. 5. The embodiment shown in FIG. 5 corresponds to the above-described embodiment shown in FIG. 1 with the difference that in addition to the first sensor 10, a second sensor 11 is provided inside the gas side 6 of the oxygenator 4. By means of the two sensors 10, 11, a pCO2 change rate value over location can be determined, i.e. the local change rate value of pCO2 between the second sensor 11 and the first sensor 10. To determine the pCO2 value on the blood side 2, the control unit 12 can gradually reduce the flow rate of gas into the inlet 14 of the oxygenator 4, until the local change rate value of pCO2 between the second sensor 11 and the first sensor 10 is zero/infinitesimal. By this mode of operation, a validated portion does not have to be known, as becomes clearer in view of FIG. 6.

Figure 6:
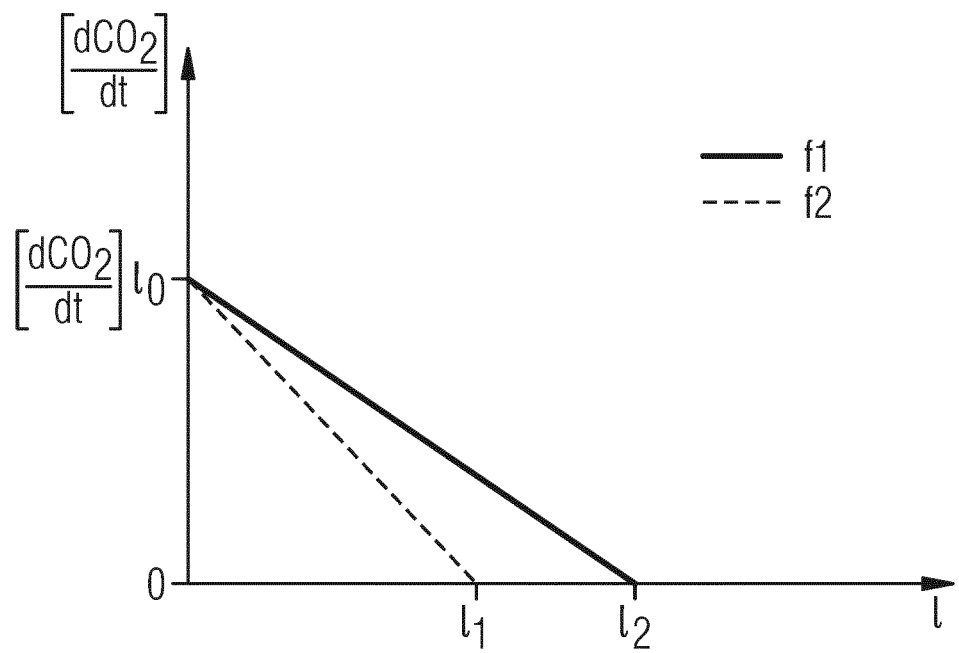
FIG. 6 shows a diagram schematically illustrating the value of the change rate over time of pCO2 of the gas side over the length of the oxygenator at two different flow rates.

FIG. 6 shows a diagram schematically illustrating the dCO2/dt value, which is the change rate value over time of pCO2 of the gas side, over the length 1 of the oxygenator at two different flow rates f1 and f2. Flow rate f1, shown with the solid line, is higher than flow rate f2, shown with the dashed line. Generally, when the flow rate of gas is reduced to a reduced flow rate, the change rate of pCO2 over time will become zero/infinitesimal, i.e. the pCO2 equilibrium value will be reached, at or downstream of a certain longitudinal section of the oxygenator 4 (provided the oxygenator 4 is sufficiently long). However, said certain longitudinal section of the oxygenator 4 depends on the particular flow rate and is shorter (seen in flow direction) for a lower flow rate and longer for a higher flow rate. Therefore, with regard to the flow rates f1 and f2, the longitudinal section 11 of the oxygenator 4 at which the dCO2/dt value becomes zero/infinitesimal at the lower flow rate f2, is shorter than or upstream of the longitudinal section 12 at which the dCO2/dt value becomes zero/infinitesimal at the higher flow rate f2. With regard to the operating mode as described along with FIG. 5 and the two sensors 10, 11 being fixedly positioned inside/at the gas side 6 of the oxygenator 4, there is a certain gas flow rate at which the two sensors 10, 11 are positioned at or downstream of the certain longitudinal section of the oxygenator 4 at which the dCO2/dt value becomes zero/infinitesimal, and this certain flow rate can be found by gradually reducing the gas flow rate until the local change rate value of pCO2 between the sensors 10, 11 is zero/infinitesimal. As an example, when the first sensor 10 is positioned at the outlet 16 and the second sensor 11 is positioned at the longitudinal section 11, and the control unit 12 starts gradually reducing the gas flow rate at the flow rate f1, the flow rate at which the local change rate becomes zero is the flow rate f2.

As an alternative to the device 1 as shown in FIG. 5, the first sensor 10 can be positioned downstream of the outlet 16, e.g. as shown in FIGS. 2 and 3, and the second sensor 11 can be positioned anywhere downstream of the inlet 14 and upstream of or at the outlet 16. However, reducing the flow rate until the change rate becomes zero/infinitesimal will be accelerated when the second sensor 11 is positioned close to the outlet 16 (and yet at least at the predetermined local measuring distance from the outlet 16).

As an alternative mode of operation, the flow rate of gas into the inlet 14 can be reduced to a predetermined flow rate with the two sensors 10, 11 being both positioned within the validated portion of the device 1, wherein the validated portion is validated for the predetermined flow rate. Gradually reducing the flow is then not necessary.

Figure 7:
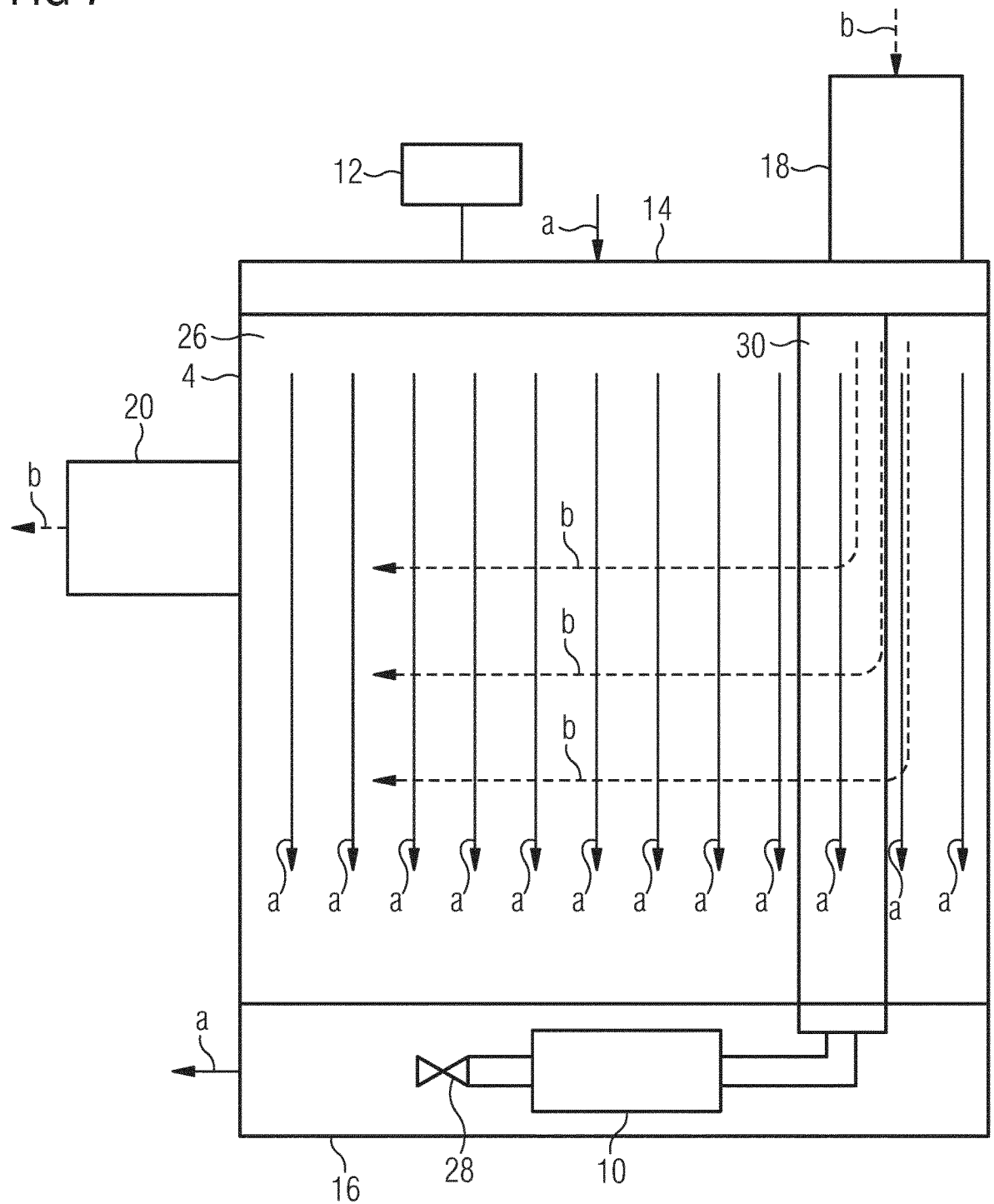
FIG. 7 shows a schematic view of a device for determination of a pCO2 value on a blood side of an oxygenator according to a fifth embodiment of the presently disclosed technology.

A fifth embodiment of the device 1 according to the presently disclosed technology is schematically shown in FIG. 7. It is schematically indicated that the gas side of the oxygenator 4 is constituted by a plurality of fibers 26. The fibers 26 are hollow fibers formed by the semipermeable membrane. The gas side of the oxygenator is located inside the hollow fibers, while the blood side of the oxygenator 4 is located outside the hollow fibers and extends around the hollow fibers. During operation of the oxygenator 4, the gas flow (indicated by arrows a) enters the oxygenator 4 at the gas inlet 14 and flows through each of the fibers 26 towards the gas outlet 16 and exits the oxygenator 4 at the gas outlet 16. The blood flow (indicated by arrows b) enters the oxygenator 4 at the blood inlet 18 and flows between the fibers 26, so that the blood flow flows around the fibers 26, towards the blood outlet 20 and exits the oxygenator 4 at the blood outlet 20.

The fifth embodiment differs from the afore-described embodiments in that the sensor 10 is connected to only a part (or subset) of the plurality of fibers 26 constituting the gas side, but not to all of the fibers 26 constituting the gas side. The part of the fibers 26, to which the sensor 10 is connected, is illustrated as a selected fiber bundle 30. The sensor 10 is provided at the downstream side of the fiber bundle 30 such that the gas flow flows through the entire length (in flow direction) of the fiber bundle 30 before flowing into the sensor 10 and finally leaving the oxygenator 4 via the gas outlet 16. A shut-off or throttle valve 28 is provided downstream of the sensor 10 such that the gas flow through the fiber bundle 30 and the sensor 10 can be stopped or reduced. In this way, the gas flow can be stopped or reduced in the fiber bundle 30, while the gas flow proceeds flowing through the remaining fibers 26 without being stopped or reduced. In other words, the gas flow through only the fiber bundle 30 can be stopped or reduced for measuring purposes by the valve 28, while leaving the gas flow through the remaining fibers 26 undisturbed.

The specific position of the fiber bundle 30 in the direction of the blood flow, i.e. the specific position of the fiber bundle 30 between the blood inlet 18 and the blood outlet 20, can be selected in accordance with the measuring purposes. In the embodiment shown in FIG. 7, the fiber bundle 30 is located at or near the blood inlet 18 so that the venous pCO2 value of the blood side can be determined. In another embodiment (not shown), the fiber bundle 30 can be located at or near the blood outlet 20 so that the arterial pCO2 value of the blood side can be determined. It is also possible to provide at least two fiber bundles at different positions, each of which connected to a sensor and a valve in the above-described manner, so that a pCO2 value of the blood side can be determined for at least two different positions. For example, one fiber bundle can be located at or near the blood inlet 18 and another fiber bundle can be located at or near the blood outlet 20 so that both the venous pCO2 and the arterial pCO2 of the blood side can be determined.

The invention claimed is:

1. A device for determination of a $CO_2$ partial pressure value on a blood side of an oxygenator, comprising:
   the oxygenator comprising the blood side, a gas side and a semipermeable membrane, wherein the semipermeable membrane separates the blood side from the gas side, the gas side has a gas inlet and a gas outlet, a gas flow flows into the gas inlet to the gas outlet-at a flow rate during operation of the oxygenator, and the gas side is formed by a plurality of hollow fibers through which the gas flow flows from the gas inlet to the gas outlet;
   a first sensor which is connected to a part of the plurality of hollow fibers of the gas side, at a downstream end of the part of the plurality of hollow fibers or downstream of the downstream end of the part of the plurality hollow fibers, the first sensor-being configured to measure $CO_2$ partial pressure values of the part of the plurality of hollow fibers of the gas side;
   a valve which is provided downstream of the first sensor, the valve being configured to stop or reduce the gas flow through the part of the plurality of hollow fibers of the gas side and the first sensor to the gas outlet in a first state and to release or increase the gas flow through the part of the plurality of hollow fibers of the gas side and the first sensor to the gas outlet in a second state; and
   a control unit which is configured to control the flow rate of the gas flow through the part of the plurality of hollow fibers of the gas side and the first sensor to the gas outlet by means of the valve, and to process the measured $CO_2$ partial pressure values of the part of the plurality of hollow fibers of the gas side and to determine a $CO_2$ partial pressure value on the blood side based on the measured $CO_2$ partial pressure values of the part of the plurality of hollow fibers of the gas side; and wherein the control unit determines the $CO_2$ partial pressure value on the blood side during the operation of the oxygenator by stopping the gas flow through the part of the plurality of hollow fibers of the gas side and the first sensor to the gas outlet by means of the valve, measuring at least one $CO_2$ partial pressure value of the part of the plurality of hollow fibers of the gas side when a validated period of time after stopping the gas flow has lapsed, and deducing the $CO_2$ partial pressure value on the blood side from the at least one $CO_2$ partial pressure value of the part of the plurality of hollow fibers of the gas side which is measured when the validated period of time has lapsed, for which validated period of time it has been proven that the $CO_2$ partial pressure of the part of the plurality of hollow fibers of the gas side reaches a saturation value.

2. The device of claim 1, wherein the control unit determines the CO2 partial pressure value on the blood side at predetermined time intervals, when a predetermined operating condition occurs, or both at the predetermined time intervals and when a predetermined operating condition occurs.

3. The device of claim 1, wherein the first sensor is positioned inside the oxygenator at the gas outlet of the gas side or downstream of the gas outlet.

4. The device of claim 1, wherein the part of the plurality of hollow fibers of the gas side, to which the first sensor is connected, is located, in a flow direction of a blood flow through the blood side, at a blood inlet.

5. The device of claim 1, wherein the part of the plurality of hollow fibers of the gas side, to which the first sensor is connected, is located, in a flow direction of a blood flow through the blood side, at a blood outlet.

* * * * *